US008381183B2

(12) United States Patent (10) Patent No.: US 8,381,183 B2
Basheer (45) Date of Patent: *Feb. 19, 2013

(54) NAVIGATION IN COMPUTER SOFTWARE APPLICATIONS DEVELOPED IN A PROCEDURAL LANGUAGE

(75) Inventor: Shafeek Basheer, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 364 days.

This patent is subject to a terminal disclaimer.

(21) Appl. No.: 12/720,895

(22) Filed: Mar. 10, 2010

(65) Prior Publication Data
US 2010/0169866 A1 Jul. 1, 2010

Related U.S. Application Data

(63) Continuation of application No. 09/797,456, filed on Mar. 1, 2001, now Pat. No. 7,685,569.

(51) Int. Cl.
*G06F 9/44* (2006.01)
(52) U.S. Cl. ......................................... 717/123
(58) Field of Classification Search ........... 717/100–123
See application file for complete search history.

(56) References Cited

U.S. PATENT DOCUMENTS

| 6,182,091 | B1 | 1/2001 | Pitkow et al. | |
| 7,685,569 | B2 * | 3/2010 | Basheer | 717/123 |

FOREIGN PATENT DOCUMENTS

| EP | 0981097 A1 | 2/2000 |
| JP | H04-330522 | 11/1992 |
| JP | H04-340130 | 11/1992 |
| JP | H05-053786 | 3/1993 |
| JP | H10-083289 | 3/1998 |
| JP | H11-085483 | 3/1999 |
| JP | H11-095988 | 4/1999 |
| JP | H11-296353 | 10/1999 |
| WO | WO9922288 A2 | 5/1999 |

OTHER PUBLICATIONS

Notice of Allowance (Mail Date Nov. 2, 2009) for U.S. Appl. No. 09/797,456, filed Mar. 1, 2001; Confirmation No. 6654.
Haas, "Page and Link Classifications: Connecting Diverse Resources", ACM, 1998, pp. 99-107.
Dewell, "Cross System Product Application Generator: Application Design", IBM System Journal, vol. 29, No. 2, 1990, pp. 265-273.
Lai, et al., "An Approach to Graph Layout to Assist in Web Navigation" IEEE 1999, pp. 314-318.
Linux, "Cross-Referencing Linux", [online]. 3 pages. [retrieved on Oct. 17, 2004]. Retrieved from the Internet: < http://web_archive.org/web/20000821212421/http://lxr.linus.no/blurb.html >. pp. 1-3; Dec. 3, 2000.
Raymond, "Reading Source Code", ACM, Proceedings of the 1991 Conference of the Centre for Advanced Studies on Collaborative Research; pp. 3-16, 1991.
Tompa, et al., "Hypertext by Link-Resolving Components", ACM, pp. 118-130, Hypertext '93 Proceedings, Nov. 1993.
Zeller, Andreas, Debugging with DDD; User's Guide and Reference Manual, First Edition, for DDD Version 3.2 last updated Jan. 3, 2000; 210 pages.
Oliver et al., "Teach Yourself HTML 4 in 24 Hours", Second Edition, Sams.net Publishing, pp. 37-50, 89-97, 1997.

(Continued)

*Primary Examiner* — Ted T Vo
(74) *Attorney, Agent, or Firm* — Schmeiser, Olsen & Watts; John Pivnichny

(57) ABSTRACT

A system and computer program product for providing a maintenance environment for computer program code Portions of the computer program code are selectively stored and one or more lists of the stored portions are created. Links are created between the lists and the stored portions of the computer program code for navigational purposes. A maintenance environment for the computer program code is provided.

20 Claims, 7 Drawing Sheets

OTHER PUBLICATIONS

McCarthy et al., "Building Enterprise Web Transactions—using VisualAge Generator JavaBeans and JSPs", IBM Redbooks, pp. i-xxii, pp. 1-393; May 2000.

Devanbu et al., "Chime: Customizable Hyperlink Insertion and Maintenance Engine for Software Engineering Environments", 1999, ICSE '99, Los Angeles, CA, pp. 473-482.

Kaiser et al., "An Architecture of WWW-based Hypercode Environments", Aug. 8, 1996, Columbia University, NY, pp. 1-11.

IBM, "VisualGen: The Future of Your VSE Applications and How You Get There from CSP", Dec. 1995, Internal Technical Support Organization, Boeblinen Germany, pp. i-xx, 1-163.

* cited by examiner

```
EZEM37                         STRUCTURE LIST                        MORE: ->
==>
          ENTER = File and continue      PF3 = File and exit       PF4 = Refresh
                              Member Name = JFBB44B
Select Definition:   S = P+F      P = Processing      F = Flow      E = Edit Object
                     O = Object Selection       Maximum => 006

Total lines 0081 . . . . . . . PROCESS AND GROUP LIST . . . . . . . . . . . . . . . . . .
SEL  NAME               LVL       OPTION         OBJECT            ERROR
***                     TOP OF LIST
001  JFBB44P-MAIN       001       EXECUTE
002  JFBB44P-EXE-INIT   002       EXECUTE
003  JFCZZS-GET-SYSIN   003       GROUP
004  JFCZZP-SCN-SYSIN   004       SCAN           JFCZZIN           EZERTN
005  JFCZZP-ADD-SYSOUT  004       ADD            JFCZZOUT          EZERTN
006  JFBB44P-INQ-R92    003       INQUIRY        JFBB44R92A        EZERTN
007  JFBB44P-EXE-LDPIWI 003       EXECUTE
```

FIG. 1

```
EZEM37                    STRUCTURE LIST                         MORE: –>
==> F JFBB44P-EXE-INIT
    ENTER = File and continue         PF3 = File and exit        PF4 = Refresh
                     Member Name = JFBB44B
Select Definition:  S = P+F   P = Processing   F = Flow   E = Edit Object
                    O = Object Selection   Maximum level=> 006
Total lines 0081 . . . . . . . PROCESS AND GROUP LIST . . . . . . . . . . . .
SEL   NAME                      LVL       OPTION         OBJECT       ERROR
***                         TOP OF LIST
001   JFBB44P-MAIN              001       EXECUTE
002   JFBB44P-EXE-INIT          002       EXECUTE EZEM39               APPLICATION PROCESS DEFINITION
==>
      PF3 = File and exit (or file and continue if more selected)
      PF4 = Validate and format          PF5 = Validate
Process = JFBB44P-MAIN                Description = Main process
Option  = EXECUTE
Total lines 0039  . . . . . . . . . STATEMENT DEFINITION. . . . . . . . . . .
```

FIG.2A

| FIG.2A |
|--------|
| FIG.2B |

FIG.2

```
***                TOP OF LIST
001  /*----------------------------------------
002  /* Monthly job to process commitment fee accruals
003  /*----------------------------------------
004  PERFORM JFBB44P-EXE-INIT;           /* Initialize Work storage
005  ..
006  /*----------------------------------------
007  /* Use parm-value from T92
008  /*----------------------------------------
009  PERFORM JFBB44P-EFF-DTE;
010  ..
011  IF JFCPIWI.APPL-RETURN-CODE EQ ' ';
012  ..
013    IF JFBB44I-UPDATE-DATE <= JFCPIWI.CURR-DTE; /* T92. date < system date
014    ..
015      PERFORM FJBB44P-EXE-COMFEE;  /* Process Commitment fee billing
```

FIG.2B

NAVIGATION IN COMPUTER SOFTWARE APPLICATIONS DEVELOPED IN A PROCEDURAL LANGUAGE

This application is a continuation application claiming priority to Ser. No. 09/797,456, filed Mar. 1, 2001, now U.S. Pat. No. 7,685,569 issued Mar. 23, 2010.

FIELD OF THE INVENTION

The present invention relates generally to maintenance of computer software applications developed in a procedural language and more specifically to navigation in such software applications.

BACKGROUND

Cross System Product (CSP) is a form of procedural programing language, designed as a strategic application generator, by IBM, to provide consistent development and execution environments across multiple hardware platforms and operating systems. The CSP environment is very user friendly for application development and saves coding time by about 70%. However, maintenance of applications developed in CSP is not as easy as the development process in that environment. This is mainly because of the manner in which CSP is structured. CSP is a form of procedural programing language.

A CSP application program consists of various objects such as records, statement groups, processes, tables etc. The program code is written as a sequence of processes and statement groups. A typical application program has one or more main processes that call other processes or statement groups. These may, in turn, call other processes and/or statement groups.

An extract of a typical CSP program is shown in FIG. 1. The process at level 001 is the main process (ie. JFBB44P-MAIN), the contents of which can be viewed by insertion of the letter 'S' in the appropriate position in the SEL column, as shown in FIG. 1, followed by a carriage return (i.e. pressing the "Enter" key).

The content of the main process, which contains calls to other processes and statement groups, is shown in FIG. 2. To view and/or edit any particular process or statement group, a user is required to first return to the higher level structure list screen of FIG. 1 and then manually input the name of the particular process or statement group to be viewed and/or edited. A return to the higher level structure list screen of FIG. 1 is performed by pressing "PF3", a pre-defined computer keyboard function key. Selection of the process JFBB44P-EXE-INIT for viewing and/or editing is, as described above, shown at the top of FIG. 2.

The above process will have to be repeated while navigating through the CSP program. If the program is large, with numerous sub-levels, navigation becomes even more difficult.

Viewing and/or editing any other objects like records or tables, necessitates returning to the list processor screen (this screen comes before the structure list screen shown in FIG. 1) for inputting of the name of the particular object.

These inherent difficulties make analysis and maintenance of program code developed in CSP a laborious task.

Consequently, a need clearly exists for an improved method and/or apparatus for analysis and maintenance of code written in CSP and other procedural languages that substantially overcomes or at least ameliorates one or more deficiencies of existing arrangements.

SUMMARY OF THE INVENTION

According to a first aspect of the present invention, there is disclosed a method for providing a maintenance environment for computer program code comprising the steps of:

selectively storing one or more portions of the computer program code;

creating one or more lists of one or more of the stored portions; and creating links for navigation of the computer program code, wherein each of the links is created between one of the stored portions and one of the lists.

According to a another aspect of the present invention, there is disclosed a computer system for providing a maintenance environment for computer program code comprising:

means for selectively storing one or more portions of the computer program code;

means for creating one or more lists of one or more of the stored portions; and means for creating links for navigation of the computer program code, wherein each of the links is created between one of the stored portions and one of the lists.

According to a further aspect of the present invention, there is disclosed a computer program product comprising a computer readable medium having a computer program recorded therein for providing a maintenance environment for computer program code, the computer program including:

computer program code means for selectively storing one or more portions of the computer program code to be maintained;

computer program code means for creating one or more lists of one or more of the stored portions; and computer program code means for creating links for navigation of the computer program code to be maintained, wherein each of the links are created between one of the stored portions and one of the lists.

The stored portions are preferably stored in separate computer files that are formatted for loading in a web-enabled browser program. The computer files may include a prologue file, a main file, process files, statement group files and record files, and are preferably HTML files.

BRIEF DESCRIPTION OF THE DRAWINGS

Features and preferred embodiments of the present invention are hereinafter described with reference to the accompanying drawings in which:

FIG. 1 shows a structure list of an exemplary CSP application program; FIG. 2, FIG. 2A and FIG. 2B shows a structure list of the main process of the CSP application program of FIG. 1;

DETAILED DESCRIPTION AND BEST MODE

The principles of the preferred method, system and computer program product described herein have general applicability to computer program code written in any procedural language. However, for ease of explanation, the preferred method, system and computer program product are described with reference to the Cross System Product (CSP) Language and HyperText Markup Language (HTML). It is not intended that the present invention be limited to the described method, system and computer program product. For example, the invention might have application to computer program code developed in procedural languages other than CSP and/or conversion of such program code to languages and/or environments other than Hyper Text Markup Language (HTML).

HTML documents or files are composed of plain ASCII text and thus do not contain control characters or embedded binary codes. A purpose of HTML is to define the structure of documents or files so that any web-enabled browser program will be able to interpret and display the document or file. HTML is defined by Standardized Generalized Markup Language (SGML), an international standard (ISO 8879) for text processing. SGML is a meta-language whose purpose is to define other languages.

An application program that has been generated in CSP can be exported to an External Source Format (ESF) file. EXPORT is a standard feature of CSP, enabling the entire CSP application program including processes, statement groups, records, etc, to be stored in ESF. An ESF file is a serial file consisting of 80-byte fixed-length records.

Figure 3:
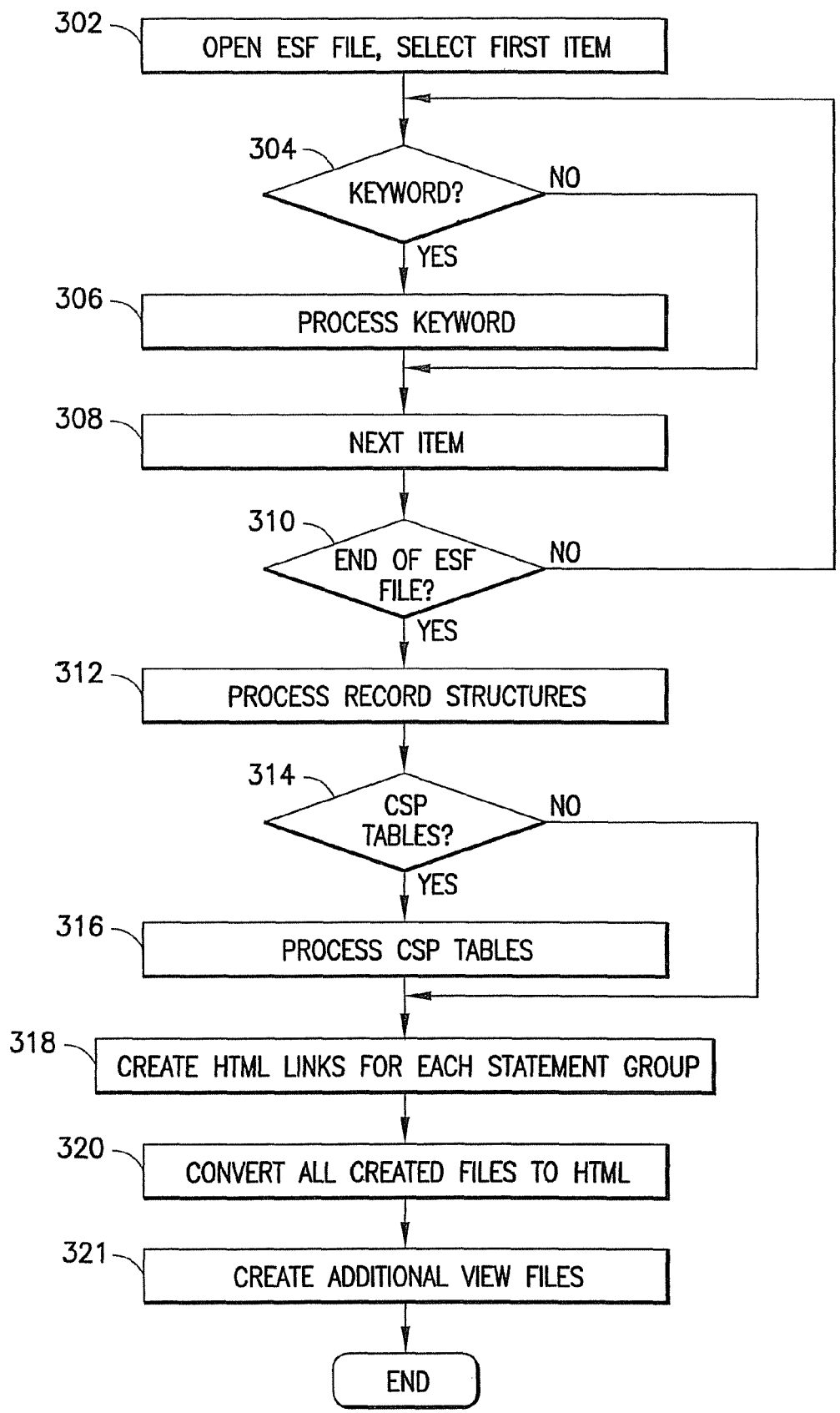
FIG. 3 shows a flowchart of a method for converting program code developed in CSP to HTML format.

FIG. 3 shows a flowchart of a method for converting program code developed in CSP to HTML format.

Figure 4:
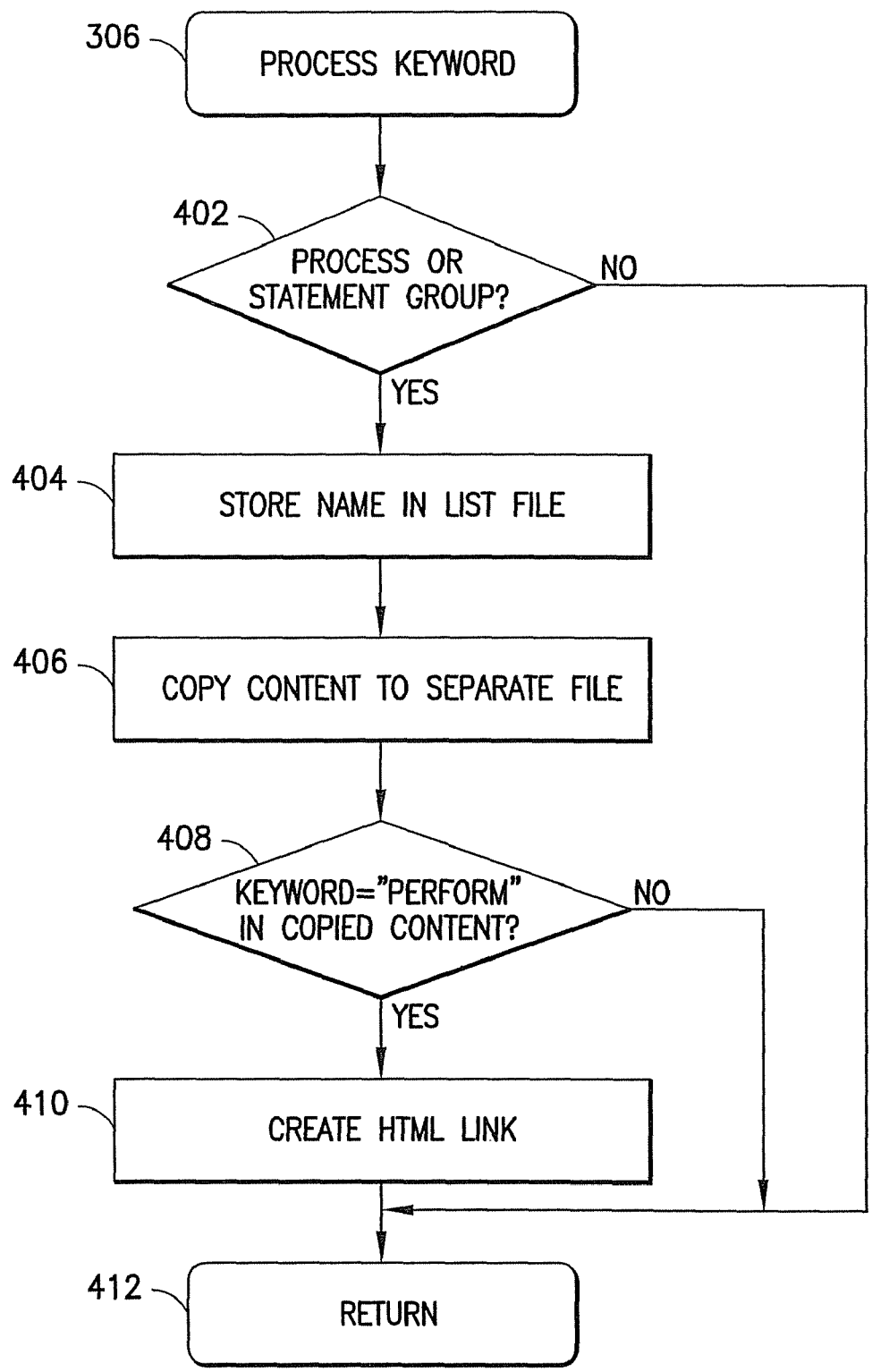
FIG. 4 shows processing of a CSP keyword in expanded detail to that shown in FIG. 3.

At step 302, the exported ESF file is opened and the first item is selected. If the selected item contains a pre-defined keyword (Y), at decision step 304, processing of the item occurs at step 306. Processing then continues at decision step 308. FIG. 4, and the description thereof, provide further detail of step 306 of FIG. 3. Examples of common keywords and the associated information obtained therewith are shown below:

| Keyword | Information obtained |
|---------|---------------------|
| :appl | Application name |
| :mapgroup | Map-group Name |
| :mainprc | Main Processes |
| :prol. | Prologue |
| :process | Process |
| :group | Statement Group |

If the selected item does not contain a keyword (N), at decision step 304, processing proceeds directly to step 312.

At step 308, the next item in the ESF file is selected. If it is determined that the end of the ESF file has not yet been reached (N), at decision step 310, processing reverts to step 304. However, if the end of the ESF file has been reached (Y), at decision step 310, processing continues at step 312.

Figure 5:
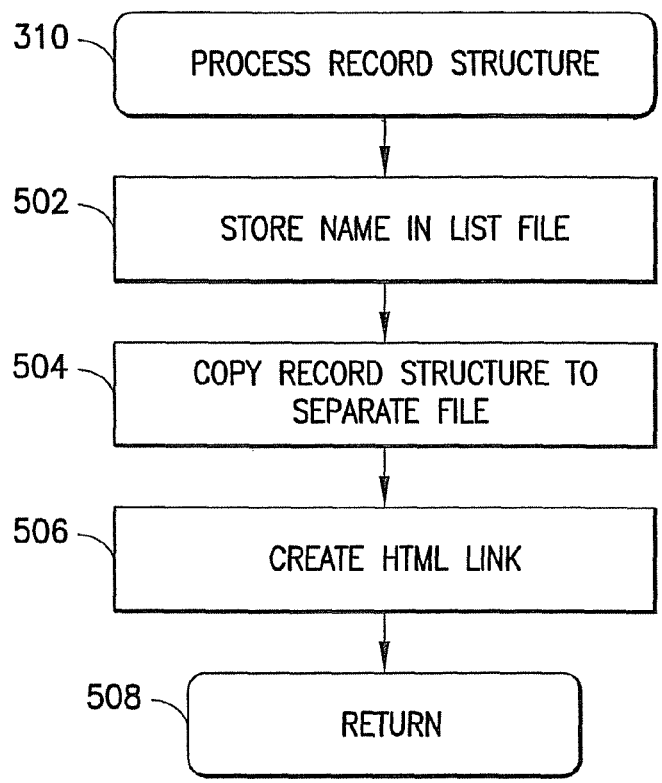
FIG. 5 shows processing of CSP record structures in expanded detail to that shown in FIG. 3.

Record structures, contained in the application program, are processed at step 312. FIG. 5, and the description thereof, provide further detail of step 312 of FIG. 3. Processing then proceeds to step 314.

Figure 6:
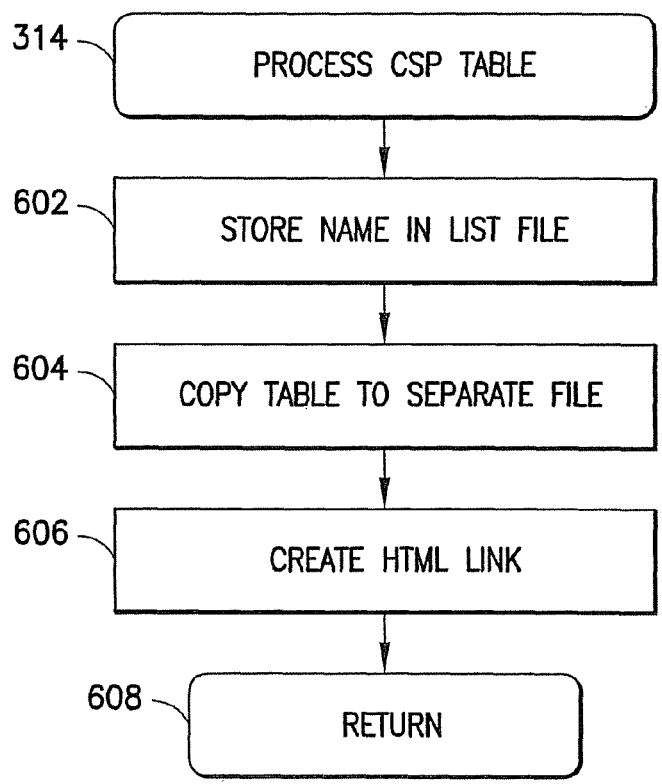
FIG. 6 shows processing of a CSP table in expanded detail to that shown in FIG. 3.

If the application program contains CSP tables (Y), at decision step 314, processing of the CSP tables occurs at step 316. FIG. 6, and the description thereof, provide further detail of step 316 of FIG. 3. Processing then proceeds to step 318.

At step 318, an HTML link is created for each statement group. As can be seen in FIG. 4, a statement group list file containing the names of all the statement groups and a separate file for each statement group would have been created and the purpose of the HTML links is to provide association and a navigation route between a particular statement group file and the name of that statement group contained in the statement group listfile.

Then, at step 320, all the created files are converted to HTML format by insertion of HTML tags in the files and renaming of the files to include the extension .htm. The created files typically include:
- process files
- statement group files
- prologue file
- main file with main process names list
- process names list file
- statement group names list file
- record files Finally, at step 322, other view files are created, as required. Examples of such view files include CSP view (this view is a tree view of the entire CSP application) and untersed (this view contains all the statement groups and processes in a single file for easy searching).

FIG. 4 shows processing of a CSP keyword in expanded detail to that shown in FIG. 3.

If the keyword represents a process or statement group (Y), at decision step 402, the name of the process or statement group is stored in the process name list file or the statement group list file, respectively, at step 404.

Then, at step 406, the content of the process or statement group is copied to a separate file, of name the same as the particular process or statement group being copied.

If the keyword "PERFORM" (meaning a call to a process) is encountered in the copied content (Y), at decision step 408, an HTML link is immediately inserted that points to a file that has the same name as the process called by the "PERFORM" instruction.

Processing then returns to step 308 of FIG. 3, via step 412.

If the keyword did not represent a process or statement group (N), at decision step 402, processing also returns to step 308 of FIG. 3, via step 412. Similarly, if the key word "PERFORM" was not encountered in the copied content (N), at decision step 408, processing likewise returns to step 308 of FIG. 3, via step 412.

FIG. 5 shows processing of CSP record structures in expanded detail to that shown in FIG. 3.

Firstly, the name of the record structure is stored in the record structure name list file at step 502. Then, at step 504, the content of the record structure is copied to a separate file, of name the same as the particular record structure being copied.

Next, at step 506, a link is created between the name of the record structure contained in the record structure name list file and the file containing the specific record structure. The link is created using anchors.

Links, in HTML documents, are hotspots that, when clicked, redirect a browser program to a different document or resource within the same document. Anchors are links to a particular location within a single file. Thus, clicking on an anchor results in redirection to a predefined position in a file. Links and anchors are usually indicated by blue, underlined text but this is dependent on browser configuration.

Processing then returns to decision step 314 of FIG. 3 via step 508.

FIG. 6 shows processing of CSP tables in expanded detail to that shown in FIG. 3.

Firstly, the name of each CSP table is stored in the CSP table name list file at step 602. Then, at step 604, the content of each CSP table is copied to a separate file, of name the same as the particular CSP table being copied. Next, at step 606, a link is created between the name of the CSP table contained in the CSP table name list file and the file containing the specific CSP table. The link is created using anchors.

Processing then returns to step 318 of FIG. 3 via step 608.

Computer Implementation

Figure 7:
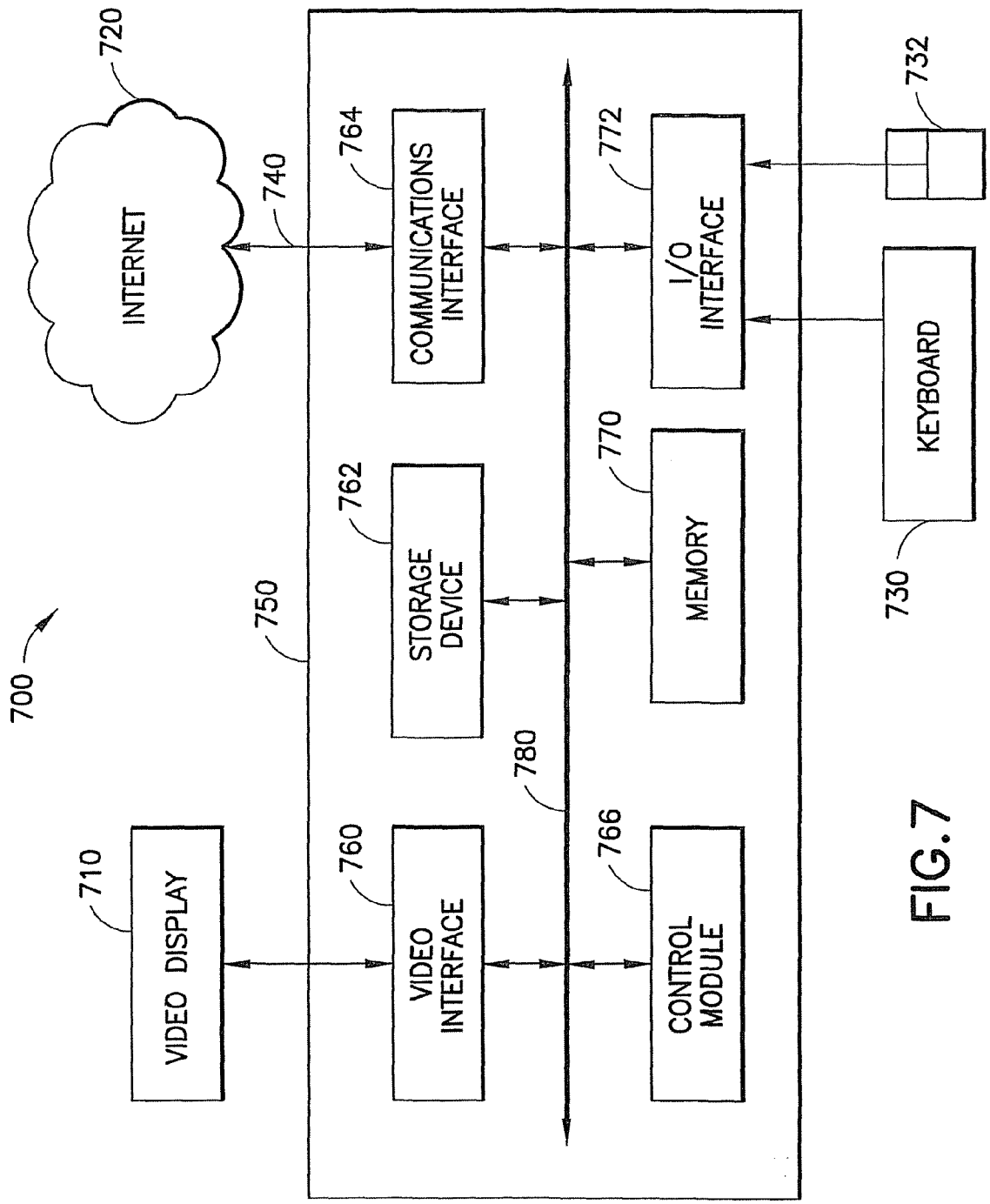
FIG. 7 shows a block diagram of an exemplary computer system on which the present invention may be practised.

The method for conversion of computer program code developed in CSP to HTML, or similar, can be implemented using a computer program product in conjunction with a computer system 700 as shown in FIG. 7. In particular, the method for conversion of computer program code developed in CSP to HTML, or similar, can be implemented as software, or computer readable program code, executing on the computer system 700.

The computer system 700 includes a computer 750, a video display 710, and input devices 730, 732. In addition, the computer system 700 can have any of a number of other output devices including line printers, laser printers, plotters, and other reproduction devices connected to the computer 750. The computer system 700 can be connected to one or more other computers via a communication interface 764 using an appropriate communication channel 740 such as a modem communications path, an electronic network, or the like. The network may include a local area network (LAN), a wide area network (WAN), an Intranet, and/or the Internet 720.

The computer 750 includes the control module 766, a memory 770 that may include random access memory (RAM) and read-only memory (ROM), input/output (I/O) interfaces 764, 772, a video interface 760, and one or more storage devices generally represented by the storage device 762. The control module 766 is implemented using a central processing unit (CPU) that executes or runs a computer readable program code that performs a particular function or related set of functions.

The video interface 760 is connected to the video display 710 and provides video signals from the computer 750 for display on the video display 710. User input to operate the computer 750 can be provided by one or more of the input devices 730, 732 via the I/O interface 772. For example, a user of the computer 750 can use a keyboard as I/O interface 730 and/or a pointing device such as a mouse as I/O interface 732. The keyboard and the mouse provide input to the computer 750. The storage device 762 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 750 is typically connected to other devices via a bus 780 that in turn can consist of data, address, and control buses.

The method steps for conversion of computer program code developed in CSP to HTML, or similar, are effected by instructions in the software that are carried out by the computer system 700. Again, the software may be implemented as one or more modules for implementing the method steps.

In particular, the software may be stored in a computer readable medium, including the storage device 762 or that is downloaded from a remote location via the interface 764 and communications channel 740 from the Internet 720 or another network location or site. The computer system 700 includes the computer readable medium having such software or program code recorded such that instructions of the software or the program code can be carried out.

The computer system 700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 766. Intermediate storage of the program code and any data including entities, tickets, and the like may be accomplished using the memory 770, possibly in concert with the storage device 762.

In some instances, the program may be supplied to the user encoded on a CD-ROM or a floppy disk (both generally depicted by the storage device 762), or alternatively could be read by the user from the network via a modem device connected to the computer 750. Still further, the computer system 700 can load the software from other computer readable media. This may include magnetic tape, a ROM or integrated circuit, a magneto-optical disk, a radio or infra-red transmission channel between the computer and another device, a computer readable card such as a PCMCIA card, and the Internet 720 and Intranets including email transmissions and information recorded on Internet sites and the like. The foregoing are merely examples of relevant computer readable media. Other computer readable media may be practised without departing from the scope and spirit of the invention.

The method for conversion of computer program code developed in CSP to HTML, or similar, can be realised in a centralised fashion in one computer system 700, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

CSP-Easy™ Implementation

A conversion program, named CSP-Easy™, is now described. The program supports conversion of CSP applications to HTML. CSP-Easy™ can be executed on Windows 95™ and Windows NT™ platforms.

After conversion, the CSP code can be viewed in a web browser such as Internet Explorer™ or Netscape Navigator™. Links are inserted to various objects such as processes, statement groups, records and tables. The different objects are colour-coded and underlined to further enhance readability and navigation of the code for software analysis and maintenance purposes.

Appendices 1 to 9 contain copies of exemplary HTML files generated from an exemplary CSP application by the CSP-Easy™ conversion program. Appendix 10 contains a copy of the CSP-Easy™ helpscreen, showing menu options for selecting the various HTML files for display in the browser window. Once an HTML file is displayed, a user can select any coloured and/or underlined reference to an object such as a process, statement group, record or table by clicking on that reference. The selected object will then be accessed and displayed.

Appendix 1 contains a copy of the start file, showing the names of the application and its main processes;

Appendix 2 contains a copy of the application prologue file;

Appendix 3 contains a copy of the process names list file;

Appendix 4 contains a copy of the statement group names list file;

Appendix 5 contains a copy of the record file;

Appendix 6 contains a copy of the main process file;

Appendix 7 contains a copy of an exemplary statement group file;

Appendix 8 contains a copy of the CSP view file, showing a tree view of the various processes and statement groups;

Appendix 9 contains a copy of an extract of the untersed file, showing a portion of the entire application program in a single file; and Appendix 10 contains a copy of the CSP-Easy™ help file.

The benefits of the CSP-Easy™ one-time conversion process from CSP to HTML include:

a) links to the various objects such as processes and statement groups enabling fast access;
b) a user-friendly interface offering easy access to all software objects such as records, tables, processes and statement groups at the click of a button;
c) colour-coding of the code of the various objects;
d) location of the CSP application in a Local Area Network (LAN) environment for faster access; and
e) increased productivity due to faster analysis of the application code.

The foregoing describes only a few arrangements and/or embodiments of the present invention, and modifications and/or changes can be made thereto without departing from the scope and spirit of the invention, the arrangements and/or embodiments being illustrative and not restrictive.

I claim:

1. A computer system comprising a processor and a computer readable memory unit coupled to the processor, said memory unit containing computer readable software code configured to be executed by the processor to implement a method for providing a maintenance environment for computer program code, said method comprising:

exporting a software application program to an external file, wherein the computer program code comprises the software application program, wherein the software application program in the external file comprises a plurality of statement group keywords, wherein each statement group keyword represents a different statement group comprising a group of statements in the software application program in the external file, and wherein the external file is an External Source Format (ESF) file which is a serial file consisting of 80-byte fixed length records;

after said exporting, storing a statement group name of each statement group in a statement group names list file and copying each statement group to a different statement group file whose name is the statement group name of the statement group being copied, wherein each statement group name in the statement group names list file is associated with a corresponding statement group file resulting from said copying each statement group to a different statement group file; and after said storing the statement group name of each statement group and said copying each statement group to the different statement group file, placing a link in the statement group names list file for each statement group name therein to provide an independent association and a navigation route between each statement group name in the statement group names list file and its associated statement group file.

2. The computer system of claim 1, wherein the external file further comprises a plurality of process keywords, wherein each process keyword represents a different executable process in the software application program in the external file, and wherein the method further comprises:

after said exporting, storing a process name of each process in a process names list file and copying each process to a different process file whose name is the process name of the process being copied, wherein each process name in the process names list file is associated with a corresponding process file resulting from said copying each process to a different process file; and after said storing the process name of each process and said copying each process to the different process file, placing a link in the process names list file for each process name therein to provide an independent association and a navigation route between each process name in the process names list file and its associated process file.

3. The computer system of claim 2, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first statement group keyword.

4. The computer system of claim 2, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first process keyword.

5. The computer system of claim 2, wherein the statement groups are at different levels in a level structure in the software application program, wherein the processes in the software application program are at different levels in the level structure, wherein each different level in the level structure has an associated level number, and wherein the method further comprises displaying a single tree view of the statement groups and processes that depicts the statement group name of each statement group, the process name of each process, and the level number of each statement group and process.

6. The computer system of claim 2, wherein after said placing a link in the process names list file for each process name therein, the process names list file comprises said link for each process name therein and text describing the statement associated with each process name therein.

7. The computer system of claim 1, wherein the software application program in the external file further comprises a plurality of record structure keywords, wherein each record structure keyword represents a different structure of records in the external file, and wherein the method comprises:

after said exporting, storing a record structure name of each record structure in a record structure names list file and copying each record structure to a different record structure file whose name is the record structure name of the record structure being copied, wherein each record structure name in the record structure names list file is associated with a corresponding record structure file resulting from said copying each record structure to a different record structure file; and after said storing the record structure name of each record structure and said copying each record structure to the different record structure file, placing a link in the record structure names list file for each record structure name therein to provide an independent association and a navigation route between each record structure name in the record structure names list file and its associated record structure file.

8. The computer system of claim 1, wherein the software application program in the external file further comprises a plurality of table keywords, wherein each table keyword represents a different table in the external file, and wherein the method comprises:

after said exporting, storing a table name of each table in a table names list file and copying each table to a different table file whose name is the table name of the table being copied, wherein each table name in the table names list file is associated with a corresponding table file resulting from said copying each table to a different table file; and after said storing the table name of each table and said copying each table to the different table file, placing a link in the table names list file for each table name therein to provide an independent association and a navigation route between each table name in the table names list file and its associated table file.

9. The computer system of claim 1, wherein the software application program in the external file further comprises a prologue table keyword representing a prologue in the software application program in the external file, and wherein the method comprises:

after said exporting, storing a prologue name of the prologue in a prologue name file and copying the prologue to a prologue file whose name is the prologue name of the prologue being copied, wherein the prologue name in the prologue file is associated with the prologue file resulting from said copying the prologue; and after said storing the prologue name and said copying the prologue to the prologue file, placing a link in the prologue name file for the prologue name therein to provide an association and a navigation route between the prologue name in the prologue list file and its associated prologue file.

10. The computer system of claim 1, wherein after said placing a link in the statement group names list file for each statement group name therein, the statement group names list file consists of said link for each statement group name therein and text describing the statement group associated with each statement group name therein.

11. A computer program product, comprising a computer readable storage device having a computer readable program code stored therein, said computer readable software code containing instructions configured to be executed by a processor of a computer system to implement a method for providing a maintenance environment for computer program code, said method comprising:

said processor exporting a software application program to an external file, wherein the computer program code comprises the software application program, wherein the software application program in the external file comprises a plurality of statement group keywords, wherein each statement group keyword represents a different statement group comprising a group of statements in the software application program in the external file, and wherein the external file is an External Source Format (ESF) file which is a serial file consisting of 80-byte fixed length records;

after said exporting, storing a statement group name of each statement group in a statement group names list file and copying each statement group to a different statement group file whose name is the statement group name of the statement group being copied, wherein each statement group name in the statement group names list file is associated with a corresponding statement group file resulting from said copying each statement group to a different statement group file; and after said storing the statement group name of each statement group and said copying each statement group to the different statement group file, placing a link in the statement group names list file for each statement group name therein to provide an independent association and a navigation route between each statement group name in the statement group names list file and its associated statement group file.

12. The computer program product of claim 11, wherein the external file further comprises a plurality of process keywords, wherein each process keyword represents a different executable process in the software application program in the external file, and wherein the method further comprises:

after said exporting, storing a process name of each process in a process names list file and copying each process to a different process file whose name is the process name of the process being copied, wherein each process name in the process names list file is associated with a corresponding process file resulting from said copying each process to a different process file; and after said storing the process name of each process and said copying each process to the different process file, placing a link in the process names list file for each process name therein to provide an independent association and a navigation route between each process name in the process names list file and its associated process file.

13. The computer program product of claim 12, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first statement group keyword.

14. The computer program product of claim 12, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first process keyword.

15. The computer program product of claim 12, wherein the statement groups are at different levels in a level structure in the software application program, wherein the processes in the software application program are at different levels in the level structure, wherein each different level in the level structure has an associated level number, and wherein the method further comprises displaying a single tree view of the statement groups and processes that depicts the statement group name of each statement group, the process name of each process, and the level number of each statement group and process.

16. The computer program product of claim 12, wherein after said placing a link in the process names list file for each process name therein, the process names list file comprises said link for each process name therein and text describing the statement associated with each process name therein.

17. The computer program product of claim 11, wherein the software application program in the external file further comprises a plurality of record structure keywords, wherein each record structure keyword represents a different structure of records in the external file, and wherein the method comprises:

after said exporting, storing a record structure name of each record structure in a record structure names list file and copying each record structure to a different record structure file whose name is the record structure name of the record structure being copied, wherein each record structure name in the record structure names list file is associated with a corresponding record structure file resulting from said copying each record structure to a different record structure file; and after said storing the record structure name of each record structure and said copying each record structure to the different record structure file, placing a link in the record structure names list file for each record structure name therein to provide an independent association and a navigation route between each record structure name in the record structure names list file and its associated record structure file.

18. The computer program product of claim 11, wherein the software application program in the external file further comprises a plurality of table keywords, wherein each table keyword represents a different table in the external file, and wherein the method comprises:

after said exporting, storing a table name of each table in a table names list file and copying each table to a different table file whose name is the table name of the table being copied, wherein each table name in the table names list file is associated with a corresponding table file resulting from said copying each table to a different table file; and after said storing the table name of each table and said copying each table to the different table file, placing a link in the table names list file for each table name therein to provide an independent association and a navigation route between each table name in the table names list file and its associated table file.

19. The computer program product of claim 11, wherein the software application program in the external file further comprises a prologue table keyword representing a prologue in the software application program in the external file, and wherein the method comprises:

after said exporting, storing a prologue name of the prologue in a prologue name file and copying the prologue to a prologue file whose name is the prologue name of the prologue being copied, wherein the prologue name in the prologue file is associated with the prologue file resulting from said copying the prologue; and after said storing the prologue name and said copying the prologue to the prologue file, placing a link in the prologue name file for the prologue name therein to provide an association and a navigation route between the prologue name in the prologue list file and its associated prologue file.

20. The computer program product of claim 11, wherein after said placing a link in the statement group names list file for each statement group name therein, the statement group names list file consists of said link for each statement group name therein and text describing the statement group associated with each statement group name therein.

\* \* \* \* \*